(12) United States Patent
Luan et al.

(10) Patent No.: US 9,019,636 B2
(45) Date of Patent: Apr. 28, 2015

(54) LENS ALIGNMENT APPARATUS AND METHOD

(75) Inventors: Jing-En Luan, Singapore (SG); Junyong Chen, Singapore (SG)

(73) Assignee: STMicroelectronics Pte Ltd., Singapore (SG)

(*) Notice: Subject to any disclaimer, the term of this patent is extended or adjusted under 35 U.S.C. 154(b) by 280 days.

(21) Appl. No.: 12/980,261

(22) Filed: Dec. 28, 2010

(65) Prior Publication Data

US 2012/0162788 A1 Jun. 28, 2012

(51) Int. Cl.
G02B 7/02 (2006.01)

(52) U.S. Cl.
CPC .............. *G02B 7/023* (2013.01); *G02B 7/025* (2013.01)

(58) Field of Classification Search
CPC ........................................................ G02B 7/003
USPC ........................................................ 359/811
See application file for complete search history.

(56) References Cited

U.S. PATENT DOCUMENTS

| | | | |
|---|---|---|---|
| 3,782,829 A | 1/1974 | Herriott | |
| 4,948,226 A | 8/1990 | Ozaki | |
| 5,280,387 A * | 1/1994 | Maruyama | 359/554 |
| 5,351,330 A | 9/1994 | Jongewaard | |
| 5,592,331 A * | 1/1997 | Eastcott | 359/554 |
| 2007/0189129 A1* | 8/2007 | Katou et al. | 369/44.15 |
| 2009/0188545 A1* | 7/2009 | Rabinowitz | 136/246 |
| 2010/0325883 A1* | 12/2010 | Westerweck et al. | 29/832 |

* cited by examiner

*Primary Examiner* — James Jones
(74) *Attorney, Agent, or Firm* — Seed IP Law Group PLLC

(57) ABSTRACT

Lens alignment apparatuses, methods and optical devices are disclosed. In accordance with various embodiments, a lens alignment apparatus may include at least one lens element positioned in a lens body. A lens alignment interface coupled to the lens element may be configured to permit the lens element to be angularly deflected relative to an axis of symmetry of the lens body. In other embodiments, a method of improving the resolution of an optical device may include translating a lens along an optical axis to maximize resolution at a first location, and determining a resolution in a second location in the imaging plane. The resolution in the second location may be improved by angularly deflecting the lens, and the position of the lens may then be fixed.

24 Claims, 3 Drawing Sheets

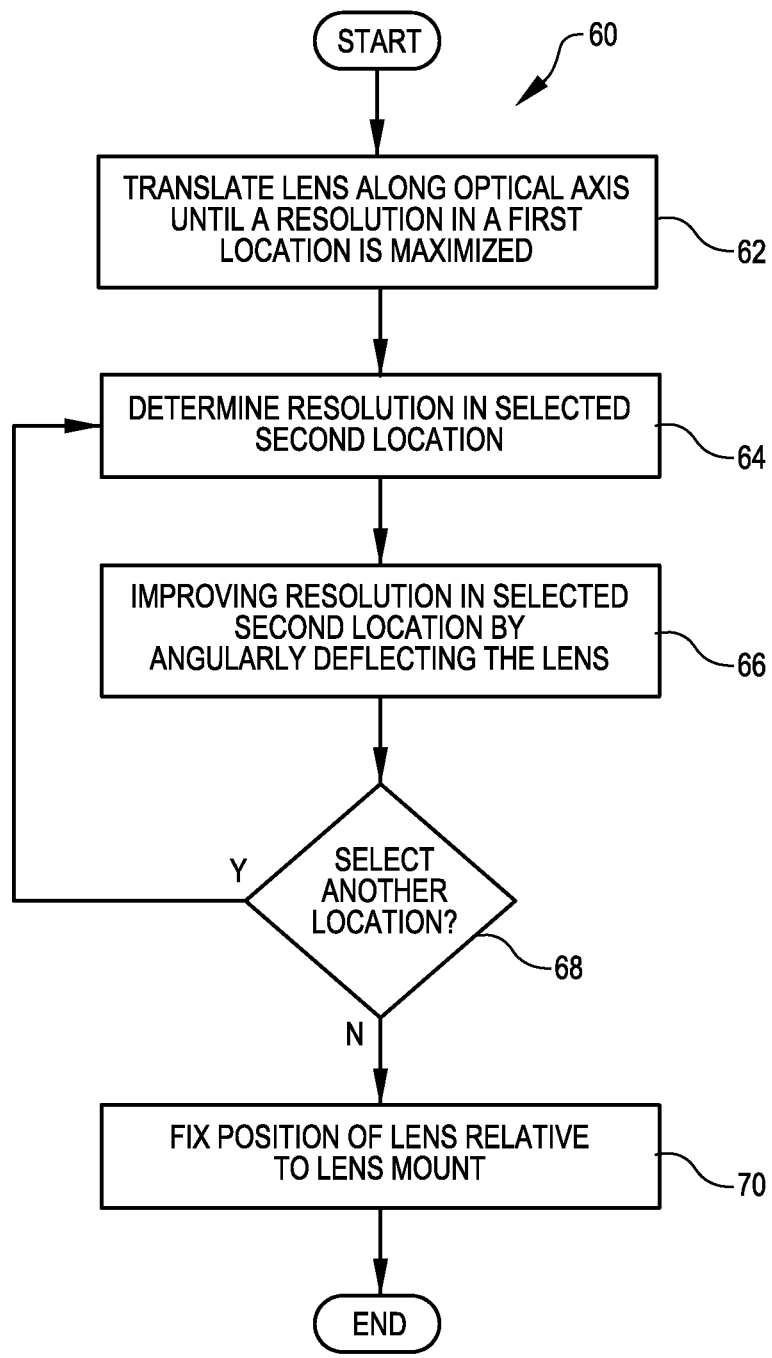

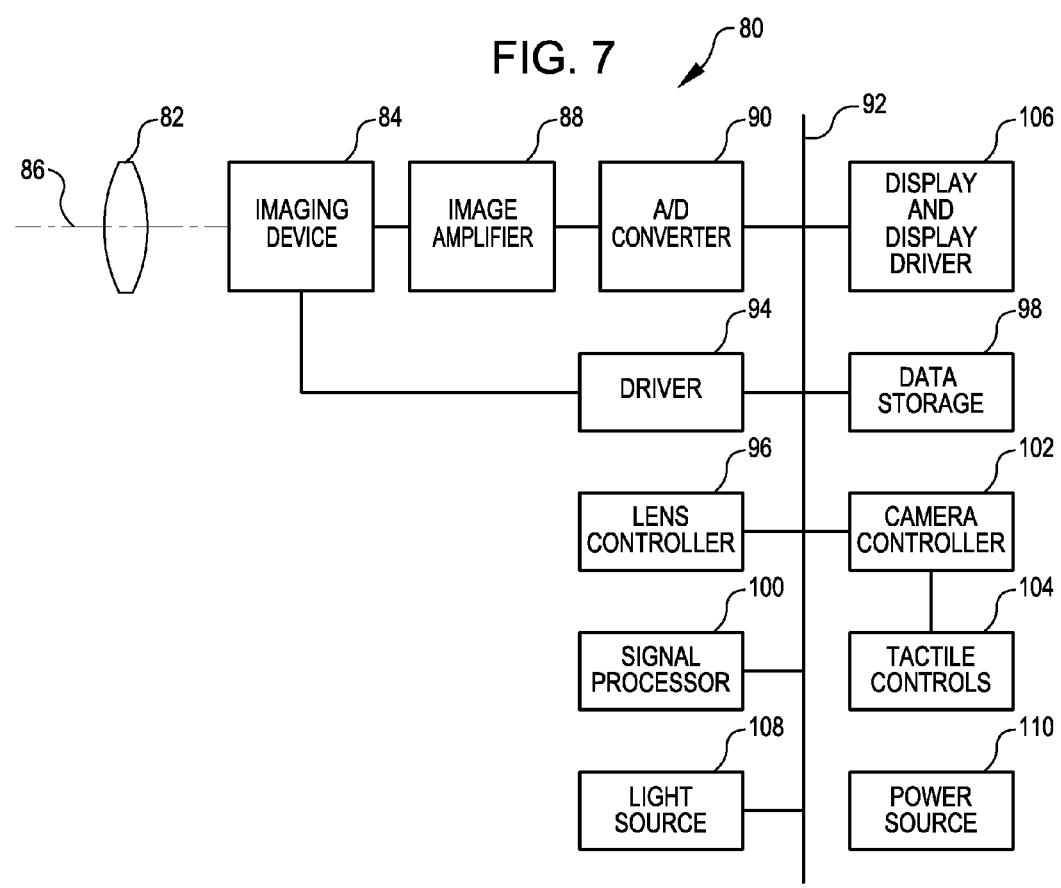

LENS ALIGNMENT APPARATUS AND METHOD

TECHNICAL FIELD

This disclosure relates generally to imaging systems, and more particularly to lens alignment apparatuses and methods in optical devices.

BACKGROUND

In various imaging systems, a lens may be positioned proximate to an imaging plane in order to resolve a subject onto the imaging plane. Accordingly, the lens may be configured with a focusing mechanism that permits the lens to be translated along an optical axis in order to achieve proper resolution of the subject on the imaging plane. Although the focusing mechanism may be properly adjusted, manufacturing or installation errors in the lens assembly may prevent proper focus from being achieved in all portions of the imaging plane.

SUMMARY

Lens alignment apparatuses, methods and optical devices are disclosed. In accordance with various aspects, a lens alignment apparatus for an optical device may include at least one lens element positioned in a lens body. A lens alignment interface coupled to the at least one lens element may be configured to permit the at least one lens element to be angularly deflected relative to an axis of symmetry of the lens body. In other aspects, a method of improving the resolution of an optical device may include translating a lens along an optical axis to maximize resolution at a first location on an imaging plane, and determining a resolution in a second location in the imaging plane. The resolution in the second location may be improved by angularly deflecting the lens, and the position of the lens may then be fixed. In accordance with still other aspects, a digital camera may include at least one lens element positioned in a lens body that is configured to resolve an image on an imaging device. A lens alignment interface may be coupled to the at least one lens element and configured to permit the at least one lens element to be angularly deflected relative to an axis of symmetry of the lens body.

BRIEF DESCRIPTION OF THE DRAWINGS

Various embodiments are described in detail in the discussion below and with reference to the following drawings.

FIG. 6 is a flowchart that will be used to describe a method of improving the resolution of an optical device, according to the various embodiments.

FIG. 7 is a diagrammatic block view of a digital camera, according to the various embodiments.

DETAILED DESCRIPTION

Figure 1:
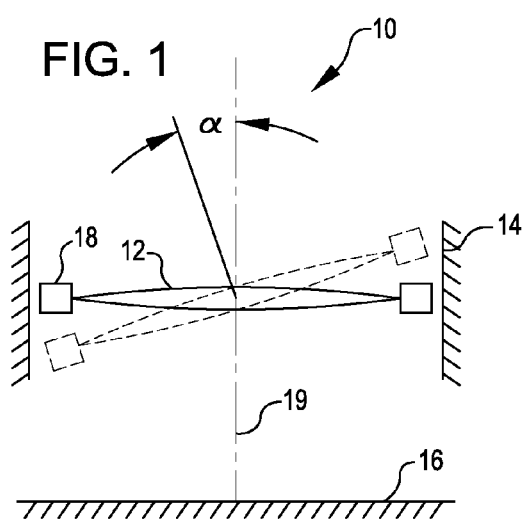
FIG. 1 is a partial cross sectional view of a lens alignment apparatus according to the various embodiments.

FIG. 1 is a partial cross sectional view of a lens alignment apparatus 10 for an optical device, according to the various embodiments. The apparatus 10 may include at least one lens element 12 positioned within a lens body 14 and spaced apart from an imaging plane 16. The lens element 12 may be translatable relative to the imaging plane 16, so that the lens element 12 may be moved inwardly towards the imaging plane 16, or outwardly and away from the imaging plane 16 in order to achieve an approximate overall focus of a subject on the imaging plane 16. The lens element 12 may also be angularly and adjustably positionable within the lens body 14 to provide improved focus in locations on the imaging plane 16 that may be relatively defocused. When the lens element 12 is positioned to provide the improved focus, the lens element 12 may be fixedly attached to the lens body 14 by a lens interface 18. For example, the lens element 12 may be positioned by rotatably adjusting the lens element 12 through an angle α relative to an axis of symmetry 19 of the lens body 14. Accordingly, portions of an optical image projected by the lens element 12 onto the imaging plane 16 that may be relatively defocused relative to other portions of the optical image on the imaging plane 16 may be corrected. For example, before the lens element 12 is adjusted in the lens body 14, a first location of the image projected onto the imaging plane 16 may be relatively acceptably focused, while one or more second locations are relatively defocused in comparison with the first location. Accordingly, alignment of the lens element 12 relative to the imaging plane 16 may be used to improve the focus of the projected image in the second locations of the imaging plane 16. Although FIG. 1 shows the lens element 12 rotated in the plane of FIG. 1 (e.g., about an axis extending outwardly from FIG. 1), it is understood that the lens element 12 may also be rotated about different axes, or even multiple axes.

Figure 2:
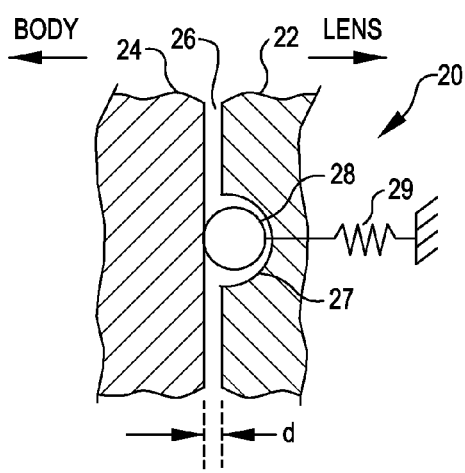
FIG. 2 is a partial cross sectional view of an alignment interface according to the various embodiments.

With reference now to FIG. 2 through FIG. 5, the alignment interface 18 of FIG. 1 will now be described in greater detail. FIG. 2 is a partial cross sectional view of an alignment interface 20 according to the various embodiments. The alignment interface 20 includes a lens mount 22 that may be rigidly coupled to the lens element 12 (as shown in FIG. 1). The lens mount 22 may be spaced apart from a lens body 24 by a gap 26 having a width "d". The gap 26 may be suitably dimensioned to permit the lens mount 22 to be rotatably angularly adjusted, as shown in detail in FIG. 1. A recess 27 may be formed in the lens mount 22 and configured to retain a rolling element 28. The rolling element 28 may be spherical, cylindrical in cross section, or even elliptical in cross section. The rolling element 28 may be urged from the recess 27 by an elastic element 29 to assist the lens mount 22 to retain a positional alignment of the lens mount 22 with the lens body 24. In the various embodiments, the elastic element 29 may include a metallic spring, such as a coil spring, that may be confined in a recess formed in the lens mount 22. The elastic element 29 may also include an elastomeric element confined in a recess formed in the lens mount 22.

Figure 3:
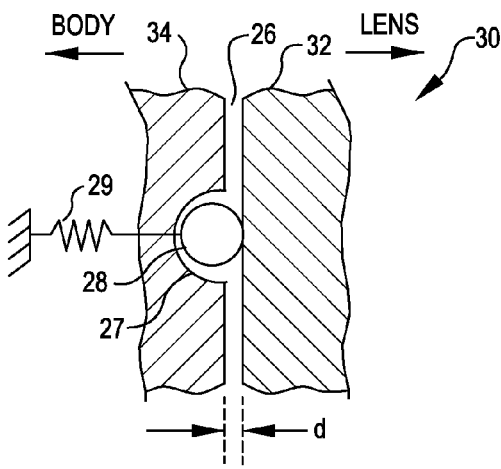
FIG. 3 is a partial cross sectional view of an alignment interface according to the various embodiments.

FIG. 3 is a partial cross sectional view of an alignment interface 30 according to the various embodiments. The lens mount 32 that supports the lens element 12 may be spaced apart from the lens body 34 by the gap 26. The gap 26 may again be suitably dimensioned to permit the lens mount 32 to be rotatably and angularly adjusted (or angularly deflected) in order to effect an adjustment of the lens element 12 (as shown in FIG. 1) relative to the lens body 34 (also shown in FIG. 1). In FIG. 3, the recess 27 may be formed in the lens body 34, as opposed to the lens mount 32, as shown in FIG. 2. The rolling element 28 may be retained in the recess 27, and be urged from the recess 27 by the elastic element 29 to assist the lens body 34 to retain positional alignment with the lens mount 32. The elastic element 29 may include a metallic spring that may be confined in a recess formed in the lens body 34, or an elastomeric element confined in a recess formed in the lens body 34.

Figure 4:
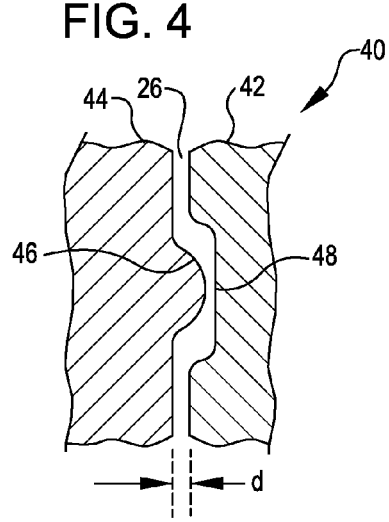
FIG. 4 is a partial cross sectional view of an alignment interface according to the various embodiments.

FIG. 4 is a partial cross sectional view of an alignment interface 40 according to the various embodiments. The alignment interface 40 includes a lens mount 42 that may be configured to receive and support the lens element 12 (FIG. 1). The lens mount 42 may be spaced apart from the lens body 44 by the gap 26 having a width "d". The gap 26 may again be suitably dimensioned to permit the lens mount 42 to be rotatably angularly adjusted within the lens body 44. The lens body 44 may include a protuberance 46 that is configured to be received by an elongated recess 48 that extends inwardly into the lens mount 42. The elongated recess 48 may be configured to permit the protuberance 46 to move within the elongated recess 48 during adjustment of the lens mount 42 relative to the lens body 44.

Figure 5:
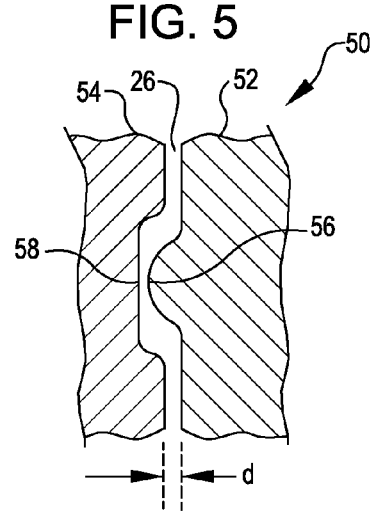
FIG. 5 is a partial cross sectional view of an alignment interface according to the various embodiments.

FIG. 5 is a partial cross sectional view of an alignment interface 50 according to the various embodiments. The alignment interface 50 includes a lens mount 52 that may be configured to receive and support the lens element 12 (FIG. 1). The lens mount 52 may be spaced apart from the lens body 44 by the gap 26 having the width "d". The gap 26 may again be suitably dimensioned to permit the lens mount 52 to be rotatably and angularly adjusted, as shown in FIG. 1. The lens body 54 may include a protuberance 56 that may be configured to be received by an elongated recess 58 that extends inwardly into the lens mount 52. The elongated recess 58 may be configured to permit the protuberance 56 to move within the elongated recess 58 during adjustment of the lens mount 52 relative to the lens body 54.

Referring again to FIG. 1, the at least one lens element 12 may be adjustably positioned within the lens body 14 in order to address image portions projected on the imaging plane 16 that are relatively defocused. One suitable measure of acceptable focus on the imaging plane 16 may be the modulation transfer function (MTF) for the lens element 12, which provides a quantitative measure of the resolving capability of the lens element 12. In general terms, the MTF will generally be higher at a center location of the imaging plane 16 (e.g., along an optical axis of the lens element 12), and relatively lower at other radial locations extending away from the center location of the imaging plane 16. Accordingly, the lens element 12 may be approximately focused along the optical axis as measured by an MTF determination at the imaging plane 16. When properly focused, the MTF value may be maximized. An MTF determination may then be made in one or more second locations that may be spaced apart from the center location, and the lens element 12 may be angularly repositioned (see FIG. 1) to provide a maximum MTF value in the selected second location. When a final position for the lens element 12 is determined (e.g., the MTF value is generally maximized in the first location and each of the selected second locations), the lens element 12 may be fixedly attached to the lens body 14 using an adhesive compound, that may be distributed into the gap 26 of a selected one of the alignment interfaces 20, 30, 40 or 50, as shown in FIG. 2 through FIG. 5, respectively. Suitable adhesives may include methyl-2-cyanoacrylate, ethyl-2-cyanoacrylate, n-butyl-cyanoacrylate, or other similar anaerobic, low viscosity adhesives.

FIG. 6 is a flowchart that will be used to describe a method 60 of adjusting the resolution of an optical device, according to the various embodiments. With reference also again to FIG. 1, at 62, the lens element 12 of the optical device may be translated along the optical axis until the resolution of an image of an optical source is maximized at a first location in the imaging plane 16. In accordance with the various embodiments, the first location may include a center location of the imaging plane 16. The resolution may be maximized by determining the MTF at the first location, or by other suitable methods. At 64, the resolution may be determined in a selected second location of the imaging plane 16. For example, the selected second location may include a peripheral location, such as a corner location that is radially-spaced apart from the center location (e.g., radially spaced apart from the axis of symmetry 19) in the imaging plane 16. Alternatively, the selected second location may include an edge location, or even a location that is proximate to the corner location or the edge location. At 66, the resolution in the selected second location may be improved by adjusting the angular position of the lens element 12 within the lens body 14. As shown in FIG. 1, the lens element 12 may be angularly adjusted through an angle α by deflecting the lens element 12 within the lens body 14. The resolution at the selected second location may be improved, for example, by computing the MTF of an image projected on the selected second location, and adjusting the lens element 12 within the lens body 14 until the MTF at the selected second location is maximized. At decision 68, the method 60 may determine if resolution is to be sampled in another location. If another location is to be sampled, the method 60 returns to 64. Otherwise, at 70, the lens element 12 may be positionally fixed within the lens body 14 by securing the lens interface 18 to the lens body 14 by introducing an adhesive compound, for example, into the gap 26 (see FIGS. 2 through 5), or by using still other methods of securing.

FIG. 7 is a diagrammatic block view of a digital camera 80, according to the various embodiments. The digital camera 80 may include a lens 82 that is configured to resolve an image of a subject onto an imaging device 84. The lens 82 may include a single lens element, as shown in FIG. 7, or more commonly, it may include a plurality of lens elements that are configured to cooperatively address the various optical deficiencies that may be introduced by using a single lens element. The lens 82 may also include a lens mount (not shown in FIG. 7) configured to retain the lens 82 in either a fixed position relative to the imaging device 84, or alternatively, the lens 82 may be positionally translatable along an optical axis 86 to assist the lens 82 in resolving the image onto the imaging device 84. Additionally, the lens 82 may include a continuously variable telephoto function (e.g., a zoom function) that may be coupled to a motor drive (not shown in FIG. 7). Alternatively, the continuously variable telephoto function may be manually adjustable by a user of the digital camera 80. The lens 82 may also be configured as an assembly that may be removably mounted to the digital camera 80. Accordingly, the lens 82 may also include suitable electrical and mechanical couplings to provide electrical and mechanical continuity between the lens 82 and the camera 80. The lens 82 may also include a lens alignment apparatus in accordance with the various embodiments, as previously described.

The imaging device 84 may include a charge-coupled device (CCD) image sensing array, a complementary metal oxide semiconductor (CMOS) image sensing array, or still other image sensing devices configured to convert light from the subject to an image signal. An image amplifier 88 may be coupled to the imaging device 84 that is configured to receive signals from the imaging device 84 and amplify the signals to a suitable level. The image amplifier 88 may be coupled to an analog-to-digital (A/D) converter 90 that is configured to receive analog signals from the image amplifier 88 and to convert the analog signals to a suitable digital format. The A/D converter 90 may be coupled to a communications bus 92 that is configured to communicate digital information between the various portions of the digital camera 80 in conformity with a selected digital communications protocol.

The imaging device 84 may also be coupled to a device driver 94 and the communications bus 92 that suitably drives the imaging device 94. A lens controller 96 may also be coupled to the communications bus 92, and may be configured to cause the device driver 94 to drive the imaging device 84. A data storage device 98 may be coupled to the communications bus 92 that is configured to store image data received from imaging device 84. The data storage device 98 may be a semiconductor memory device, or it may be configured to store the image data on magnetic media, such as a disk drive, or other similar devices. A signal processor 100 may also be coupled to the communications bus 92. The signal processor 100 may be configured to read image data stored in the data storage device 98, and to process the image data in accordance with various processing parameters. For example, the signal processor 100 may be configured to provide gradation conversion, white balance correction, gamma correction, or other suitable processing functions.

Still referring to FIG. 7, the digital camera 80 may also include a camera controller 102 that may be configured to control various functions for the digital camera 80, such as controlling access to the communications bus 92, and also receiving commands from tactile controls 104. The tactile controls 104 may be configured to initiate the recording of an image by the digital camera 80 by providing a user-depressible actuator, for example. The tactile controls 104 may also include one or more user-actuated controls that may be configured to select various functions or settings from a menu that may be provided on a visual display 106.

The digital camera 80 may also include a light source 108 that may be configured to provide additional illumination for an object. For example, the light source may include a strobe illuminator that may be configured to receive instructions from the camera controller 102, so that a suitable illumination level is achieved. A power source 110 may also be provided, which may include a rechargeable battery, or even a power supply that coupled to a domestic alternating current (AC) power source. Although the foregoing discussion has described the digital camera 180 in detail, it is understood that the digital camera 80 may be incorporated into other devices, such as a wireless communications device.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A lens alignment apparatus for an optical device, comprising:
at least one lens element positioned in a lens body;
a lens alignment interface coupled to the at least one lens element such that the at least one lens element may be angularly deflected relative to an axis of symmetry of the lens body; and
an elastic member biasing the lens alignment interface against the lens body.

2. The lens alignment apparatus of claim 1, wherein the lens alignment interface includes a rolling element extending between the at least one lens element and the lens body.

3. A lens alignment apparatus for an optical device, comprising:
at least one lens element positioned in a lens body; and
a lens alignment interface coupled to the at least one lens element and configured to permit the at least one lens element to be angularly deflected relative to an axis of symmetry of the lens body;
wherein the lens alignment interface includes a rolling element extending between the at least one lens element and the lens body; and
wherein the rolling element is urged against the lens body by an elastic element.

4. A lens alignment apparatus for an optical device, comprising:
at least one lens element positioned in a lens body; and
a lens alignment interface coupled to the at least one lens element and configured to permit the at least one lens element to be angularly deflected relative to an axis of symmetry of the lens body;
wherein the lens alignment interface includes a rolling element extending between the at least one lens element and the lens body; and
further comprising a lens mount that retains the at least one lens element, wherein the rolling element is urged against the lens mount by an elastic element.

5. A lens alignment apparatus for an optical device, comprising:
at least one lens element positioned in a lens body;
a lens alignment interface coupled to the at least one lens element and configured to permit the at least one lens element to be angularly deflected relative to an axis of symmetry of the lens body; and
a lens mount that retains the at least one lens element, wherein the lens alignment interface includes a protuberance extending from the lens body and configured to engage an elongated slot in the lens mount.

6. A lens alignment apparatus for an optical device, comprising:
at least one lens element positioned in a lens body;
a lens alignment interface coupled to the at least one lens element and configured to permit the at least one lens element to be angularly deflected relative to an axis of symmetry of the lens body; and
a lens mount that retains the at least one lens element, wherein the lens alignment interface includes a protuberance extending from the lens mount and configured to engage an elongated slot in the lens body.

7. A lens alignment apparatus for an optical device, comprising:
at least one lens element positioned in a lens body and configured to resolve an image on an imaging plane; and
a lens alignment interface coupled to the at least one lens element and configured to adjust the at least one lens element angularly relative to an axis of symmetry of the lens body such that the lens alignment interface is engaged with the lens body,
wherein the lens alignment interface includes a rolling element extending between the at least one lens element and the lens body.

8. The lens alignment apparatus of claim 7, wherein the lens alignment interface includes an elastic element configured to urge the rolling element against the lens body.

9. The lens alignment apparatus of claim 7, comprising a lens mount that retains the at least one lens element, wherein the rolling element is urged against the lens mount by an elastic element.

10. The lens alignment apparatus of claim 7, comprising a lens mount that retains the at least one lens element, further wherein the lens alignment interface includes a protuberance extending from the lens body and configured to engage an elongated slot in the lens mount.

11. The lens alignment apparatus of claim 7, comprising a lens mount that retains the at least one lens element, further wherein the lens alignment interface includes a protuberance extending from the lens mount and configured to engage an elongated slot in the lens body.

12. A method of improving the resolution of an optical device, comprising:
 translating a lens along an optical axis to maximize resolution at a first location on an imaging plane;
 determining a resolution in a second location in the imaging plane;
 improving the resolution in the second location by angularly deflecting the lens; and
 permanently fixing the position of the lens.

13. The method of claim 12, wherein translating a lens along an optical axis to maximize resolution at a first location comprises maximizing the resolution at a center location of the imaging plane.

14. A method of improving the resolution of an optical device, comprising:
 translating a lens along an optical axis to maximize resolution at a first location on an imaging plane;
 determining a resolution in a second location in the imaging plane;
 improving the resolution in the second location by angularly deflecting the lens; and
 fixing the position of the lens;
 wherein translating a lens along an optical axis to maximize resolution at a first location comprises maximizing the resolution at a center location of the imaging plane; and
 wherein maximizing the resolution at a center location of the imaging plane comprises maximizing the value of a modulation transfer function at the center location.

15. A method of improving the resolution of an optical device, comprising:
 translating a lens along an optical axis to maximize resolution at a first location on an imaging plane;
 determining a resolution in a second location in the imaging plane;
 improving the resolution in the second location by angularly deflecting the lens; and
 fixing the position of the lens;
 wherein determining a resolution in a second location in the imaging plane comprises determining the resolution in a peripheral location on the imaging plane.

16. The method of claim 15, wherein determining the resolution in a peripheral location on the imaging plane comprises determining the resolution in one of a corner location of the imaging plane, and an edge location of the imaging plane.

17. A method of improving the resolution of an optical device, comprising:
 translating a lens along an optical axis to maximize resolution at a first location on an imaging plane;
 determining a resolution in a second location in the imaging plane;
 improving the resolution in the second location by angularly deflecting the lens; and
 fixing the position of the lens;
 wherein improving the resolution in the second location comprises maximizing a value for a modulation transfer function in the second location.

18. A method of improving the resolution of an optical device, comprising:
 translating a lens along an optical axis to maximize resolution at a first location on an imaging plane;
 determining a resolution in a second location in the imaging plane;
 improving the resolution in the second location by angularly deflecting the lens; and
 fixing the position of the lens;
 wherein fixing the position of the lens comprises applying an adhesive compound to retain the position of the lens.

19. A digital camera, comprising:
 at least one lens element positioned in a lens body and configured to resolve an image on an imaging device; and
 a lens alignment interface coupled to the at least one lens element and configured to angularly deflect the lens relative to an axis of symmetry of the lens body according to a function suited to improve resolution at a first location and a second location on the imaging device,
 wherein the lens alignment interface includes a rolling element extending between the at least one lens element and the lens body.

20. The digital camera of claim 19, wherein the lens alignment interface includes an elastic element configured to urge the rolling element against the lens body.

21. The digital camera of claim 19, wherein the lens alignment interface includes a lens mount that retains the at least one lens element, wherein the rolling element is urged against the lens mount by an elastic element.

22. The digital camera of claim 19, comprising a lens mount that retains the at least one lens element, further wherein the lens alignment interface includes a protuberance extending from the lens body and configured to engage an elongated slot in the lens mount.

23. The digital camera of claim 19, comprising a lens mount that retains the at least one lens element, further wherein the lens alignment interface includes a protuberance extending from the lens mount and configured to engage an elongated slot in the lens body.

24. The digital camera of claim 19, wherein the imaging device comprises one of a charge-coupled device (CCD) image sensing array, and a complementary metal oxide semiconductor (CMOS) image sensing array.

* * * * *